United States Patent [19]

Madigan et al.

[11] 4,080,068
[45] Mar. 21, 1978

[54] EXTREMELY HIGH SPEED HALFTONE SCREEN POSITIONING ASSEMBLY

[75] Inventors: Thomas M. Madigan, Pittsford; Daniel H. Robbins, Rochester, both of N.Y.

[73] Assignee: Itek Corporation, Lexington, Mass.

[21] Appl. No.: 686,760

[22] Filed: May 17, 1976

Related U.S. Application Data

[63] Continuation-in-part of Ser. No. 680,603, Apr. 27, 1976, abandoned.

[51] Int. Cl.² .............................................. G03B 27/60
[52] U.S. Cl. ........................................ 355/73; 355/71
[58] Field of Search ...................... 355/71, 73, 76, 92, 355/72

[56] References Cited

U.S. PATENT DOCUMENTS

| | | | |
|---|---|---|---|
| 3,063,337 | 11/1962 | Anander | 355/73 |
| 3,068,748 | 12/1962 | Schutt et al. | 355/73 |
| 3,433,567 | 3/1969 | MacPhee et al. | 355/76 |
| 3,510,217 | 5/1970 | Cirimele et al. | 355/92 X |
| 3,547,537 | 12/1970 | Betron | 355/92 |

Primary Examiner—Richard A. Wintercorn
Attorney, Agent, or Firm—Homer O. Blair; Robert L. Nathans; Gerald H. Glanzman

[57] ABSTRACT

A contact screen positioning device supports a flexible bowed halftone screen over a vacuum platen having a sheet of film thereon so that as the positioning device moves slowly down over the vacuum platen, central portions of the contact screen initially press against central portions of the platen and less and less centralized portions thereafter sequentially press against less and less centralized portions of said vacuum platen, to produce a rapid sweeping of air toward outer portions of the platen for rapid positioning of said screen over said platen without entrapped air pockets being formed between the screen and the film on the platen.

33 Claims, 5 Drawing Figures

EXTREMELY HIGH SPEED HALFTONE SCREEN POSITIONING ASSEMBLY

This is a continuation in part of Ser. No. 680,603, filed Apr. 27, 1976, now abandoned, entitled "Extremely High Speed Halftone Screen Positioning Assembly" in the name of Thomas M. Madigan et al. and assigned to the same assignee of record of the subject application.

BACKGROUND OF THE INVENTION

This invention relates to the field of flexible contact screen positioning mechanisms.

Various mechanisms for positioning transparent flexible halftone screens over a photosensitive sheet positioned upon a vacuum platen have been employed in the prior art. These systems generally are relatively slow in carrying out the evacuation of air pockets formed between the halftone screen and the film upon the vacuum platen. See, for example, U.S. Pat. No. 3,068,748 to Schutt et al. which illustrates a movable roller attached to a frame which sequentially presses the screen over the film placed upon a vacuum platen. See also pending U.S. patent application in the name of Juergen Lein entitled "Device for Applying a Flexible Halftone Screen Over a Camera Vacuum Platen," said application being assigned to the same assignee as the present invention. It is therefore desirable to provide a contact screen positioning assembly which reduces the time period required to position the screen over the film positioned upon the vacuum platen without air pockets being formed between the screen and the film. It is also desirable to provide an assembly which is highly reliable in its operation. It is also desirable to provide an assembly which provides for easy and quick stripping away of the screen from the vacuum platen.

SUMMARY OF THE INVENTION

In accordance with a preferred embodiment of the present invention, a vertically movable screen position shifter, which is oriented generally parallel with the surface of the vacuum platen, has contact screen support means at opposite portions thereof for suspending the bowed flexible contact screen over the platen. As the screen position shifter is moved downwardly, central portions of the contact screen press against central portions of the vacuum platen having film thereover, and less and less centralized portions of the screen thereafter sequentially press against less and less centralized portions of the platen which action sweeps the air, which may otherwise be trapped, outwardly toward outer portions of the platen for rapid evacuation.

In the preferred embodiments, contact screen support means are employed to maintain the screen carrier in a bowed condition so that upon initial contact of the screen with the film, there is little opportunity for air to be trapped between the screen and the film. As the bowed screen is flattened, the air is swept outwardly instead of being trapped, to be removed by air holes in the platen surrounding the film.

Other objects, features, and advantages of the present invention will become apparent upon the perusal of the following detailed description taken in conjunction with the figures in which.

DETAILED DESCRIPTION

Figure 1:
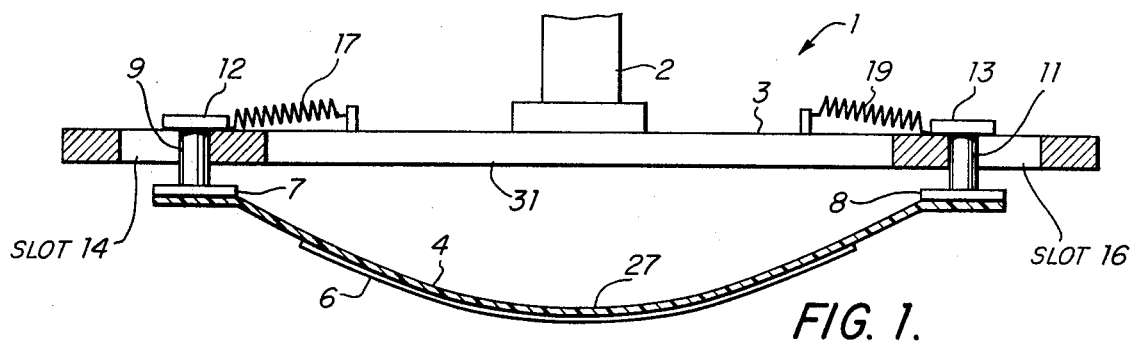
FIGS. 1 and 2 illustrate the operation of one embodiment.

In FIG. 1, screen position shifter 1 is illustrated having a vertically oriented support rod 2 affixed to frame member 3. A screen carrier 4 having a flexible halftone screen 6 attached thereto is in turn coupled to weights 7 and 8. Studs 9 and 11 are attached to weights 7 and 8 and have head portions 12 and 13 for preventing the studs from dropping out of narrow elongated slots 14 and 16. Spring members 17 and 19 are attached to frame 3 at inner portions thereof and are attached to studs 12 and 13 in order to mechanically bias the studs against the inner most portions of narrow slots 14 and 16 as illustrated in FIG. 1.

Figure 2:
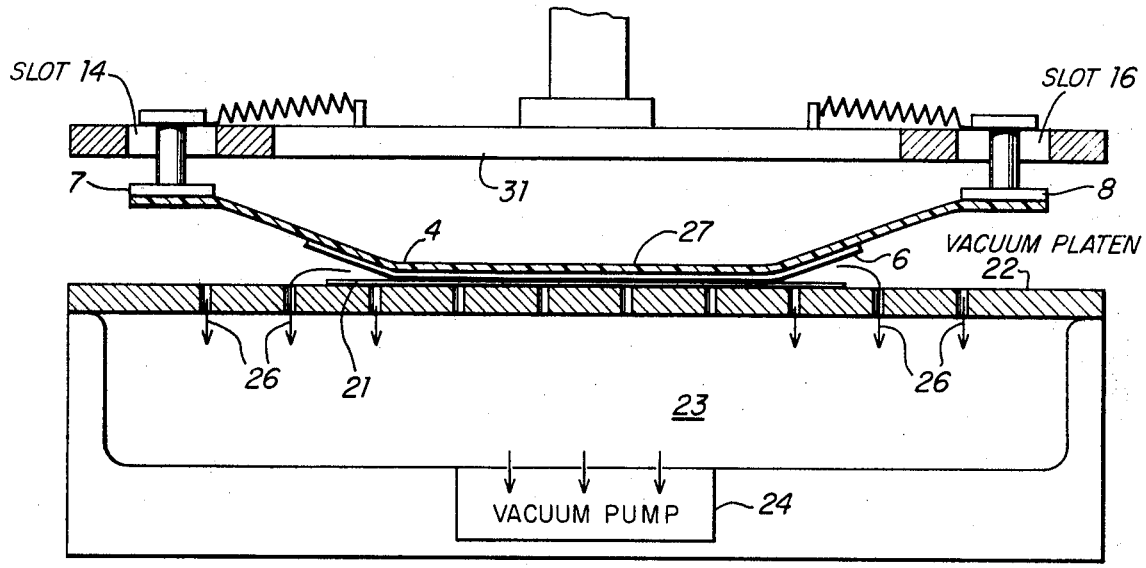

The above-described structure maintains the studs in the position illustrated to maintain the flexible screen support in the bowed position. Film 21 is positioned upon vacuum platen 22 as illustrated in FIG. 2. A vacuum is created in chamber 23 by means of vacuum pump 24 so that air may be pulled through the holes 26 in platen 22.

Figure 3:
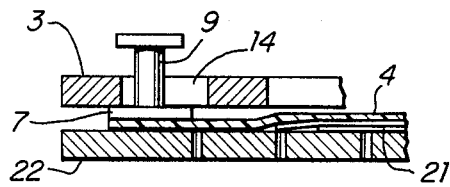
FIG. 3 illustrates a detail of the embodiment of FIG. 2 in the lower most position.

During the initial contact period between the film and the centralized portion 27 of screen 6, only a very small contact area is present so that air is not trapped between the screen 6 and film 21. As frame 3 descends further, less and less centralized portions of the screen sequentially contact less and less centralized portions of the platen so that air is swept outwardly, instead of being trapped at the screen-film interface as in the prior art. As the descent continues, the swept air is transported to the vacuum holes surrounding the outer edges of film 21 and readily drawn through the exposed holes in vacuum platen 23 surrounding the film. Springs 17 and 19 along with weights 7 and 8 offer resistance to the bowed carrier 4 so that the carrier is effective in positively sweeping air outwardly. As the screen drops further, the contact angle decreases so that less and less air remains to be exhausted while the remaining uncovered holes become more effective in sucking out the remaining air. At the lower most position of the screen position shifter, the screen will be placed flatly across the platen while weight 7 will push against the vacuum platen as shown in FIG. 3. The optical image is projected through the cut out centralized portion 31 of frame 3 to expose the film through the contact screen 6.

The screen position shifter thereafter moves upwardly so that the shifter reassumes the position illustrated in FIG. 1. Since the bowed screen support carrier is again freely suspended, the springs will again cause studs 13 and 14 to move inwardly against inner portions of slots 14 and 16 in order to insure that the screen carrier 4 reassumes the bowed position illustrated in FIG. 1. Thus, the carrier support members are configured to cause a positive air sweeping action and to prevent the formation of air pockets which could occur if the screen is laid down over the platen in an uncontrolled fashion. Of course, the screen position shifter is removed in instances where the halftone screen is not to be employed in the camera.

Figure 5:
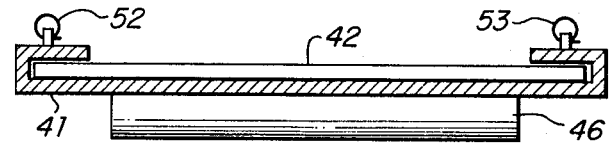
FIG. 5 illustrates a section taken through the carriage 41 of FIG. 4.
Figure 4:
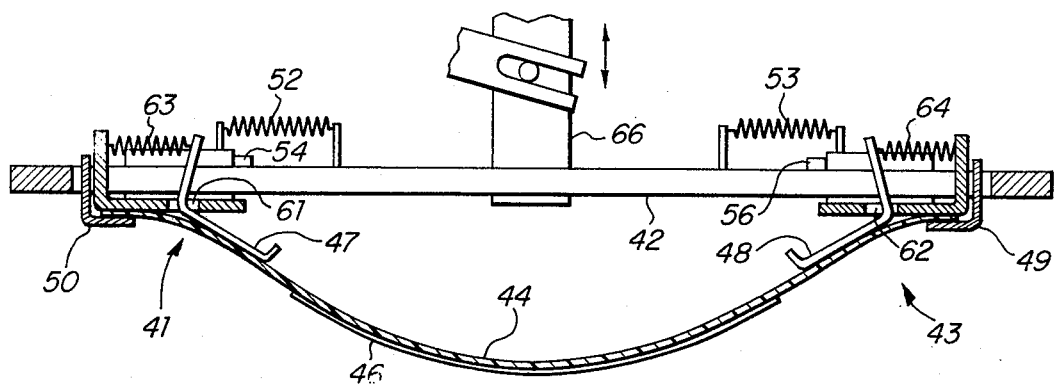
FIG. 4 illustrates the most preferred embodiment.

The above-described embodiment was found to have certain drawbacks which, upon further development efforts, have been overcome by the most preferred embodiment illustrated in FIGS. 4 and 5. Upon the testing of the above-described embodiment, it was found that the stud/slot arrangement was found to be susceptible to binding which inhibited the smooth action required to best evacuate the center of the plate material. The above-described stud-slot configuration was replaced by U-shaped sliding cross members having biasing springs attached thereto. The biasing forces are more efficiently used to retard the initial outward sweep of the screen rather than overcoming the friction of the stud-slot arrangement. By preventing tilt of the weights coupled to the studs, the proper droop to apply pressure on the platen is maintained at the center. The plastic screen holder is preferably 0.01 inch thick which increases the beam strength of the column (screen and holder) which in turn produces increased applied force without buckle.

Other changes were employed to improve the evacuating characteristics at the outer edges of the screen. As the screen of the previously described embodiment drops, the droop angle gets smaller until it is almost horizontal at the edges. This resulted in somewhat insufficient "sweeping" force to evacuate the air from the ends of the plate. In addition, the screen and holder had a tendency to reverse buckle in this area, if dropped fast, leaving an air bubble that was difficult to remove. To eliminate these problems, additional spring loaded pads were attached to the weighted cross members. These pads are pivotable and press against the upper surface of the screen holder to maintain a given angle between the screen and the platen until the pads touch the platen at the edges. They then pivot to a horizontal position under a resisting spring force. This pad configuration sweeps clear the remaining air and in addition prevents reverse buckling of the screen.

More specifically, first carriage means 41 illustrated in FIGS. 4 and 5 is slidably mounted upon one portion of screen frame 42 while second carriage means 43 is slidably mounted upon an opposite portion of screen frame 42. Screen holder 44 bearing screen 46 is coupled to pivotable pads 47 and 48 as illustrated in FIG. 4. Clamps 49 and 50 may be employed to clamp the screen holder to the first and second carriage means. Carriage springs 52 and 53 inwardly bias the carriages, or U-shaped slide members, against stops 54 and 56 in the manner illustrated in FIG. 4. Pivotable pads 47 and 48 pass through apertures 61 and 62 and are attached to and spring biased by pad springs 63 and 64 in order to positively maintain them at the angle illustrated.

As the screen shifter 66 descends, screen 46 is thus maintained at the desired angle with respect to the platen surface and air is swept outwardly in a smooth, positive manner. At the extreme downward position of screen shifter 66, pivotable pads 47 and 48 contact the surface of the platen and the resulting reaction forces cause the pads to pivot to abruptly flatten the outer portions of the screen holder thereby to effect the desired results discussed hereinabove. However, before the pads contact the platen and as less and less centralized portions of screen 46 press against the surface of the platen, the carriages will be translated without tipping and substantially parallel to the platen surface against the restraining forces of carriage springs 52 and 53 to effect the proper control of the air sweeping action.

As the screen is again raised, pivotable pads 47 and 48 will be rotated by pad springs 63 and 64 so that they reassume the position illustrated in FIG. 4. The carriages or U-shaped slide members will again be positioned against stops 54 and 56 by carriage springs 52 and 53 so that the screen is maintained at the desired angle of attack with respect to subsequent use of the screen.

In summary, it should be appreciated that the above-described structure causes a positive sweeping of air outwardly so as to be evacuated by vacuum holes lying adjacent the outer most edges of the film. The bowed nature of the carrier enables the beneficial sweeping action to be produced by preventing the above-mentioned formation of air pockets due to entrapment of air which generally occurs in the prior art. Furthermore, the above-described configurations allow a contact screen to be easily stripped away from the platen under high vacuum because the vacuum is broken from the edges and at an angle rather than by means of a straight upward movement as in prior art systems.

While the specifically described structure of the contact carrier support means is preferred, it is believed that numerous other support means may be employed. It is deemed highly desirable that the screen carrier be supported by structures which will always cause the carrier to be properly bowed when the screen shifter is raised. If the screen carrier is relatively heavy, the effect of gravity should aid significantly in this regard. It may be possible to eliminate the screen carrier and practice the present invention with only a screen which would be lighter than the carrier screen combination. While spring biased slidable carriages and pivotable pads are preferred, obviously other devices may be employed to control proper screen movement. While film 21 will preferably be in rectangular cut sheet form, it is believed practicable, if desired, to employ the present invention with film in roll form so long as the screen or screen carrier overlaps the film along the sides of the film having exposed vacuum holes adjacent thereto.

While preferred embodiments of the invention have been described, the teachings of the invention will readily suggest many other embodiments to those skilled in the art within the scope of the following claims.

What is claimed is:

1. A contact screen positioning assembly for positioning a flexible contact screen with respect to a vacuum platen which is in turn positioned at the imaging plane of a camera comprising a screen position shifter including contact screen support means positioned upon said screen position shifter for supporting said flexible contact screen and causing said screen to assume a bowed shape before being pressed against said vacuum platen, said screen shifter being movable with respect to said vacuum platen for initially causing central portions of said contact screen to contact central portions of said platen and for thereafter sequentially causing less and less centralized portions of said contact screen to contact less and less centralized portions of said platen.

2. The combination as set forth in claim 1 wherein said contact screen support means include elongated members which are movable with respect to said screen position shifter.

3. The combination as set forth in claim 2 wherein said movable elongated members comprise studs which are movable in directions parallel to their longitudinal axis, each of said studs being supported in slots formed within said screen position shifter for further permitting motion of said studs transverse to said longitudinal axis of said studs.

4. The combination as set forth in claim 2 wherein said elongated movable elongated members comprise studs which are movable in directions parallel to their longitudinal axis, each of said studs being supported in slots formed within said screen position shifter for further permitting motion of said studs transverse to said longitudinal axis of said studs.

5. The combination as set forth in claim 2 wherein said movable elongated support members have weights affixed thereto at lower portions thereof.

6. The combination as set forth in claim 3 wherein said studs have weights affixed thereto at lower portions thereof.

7. The combination as set forth in claim 2 further including means for mechanically biasing said movable elongated members in directions toward centralized portions of said screen position shifter.

8. The combination as set forth in claim 3 further including means for mechanically biasing said studs in directions toward inner portions of said slots.

9. The combination as set forth in claim 5 further including means for mechanically biasing said studs in directions toward inner portions of said slots.

10. The combination as set forth in claim 6 further including means for mechanically biasing said studs toward inner portions of said slots.

11. A contact screen positioning assembly for positioning a flexible contact screen with respect to a vacuum platen which is in turn positioned at the imaging plane of a camera comprising a screen position shifter movable with respect to said vacuum platen for initially causing central portions of said contact screen to contact central portions of said platen and for thereafter sequentially causing less and less centralized portions of said contact screen to sequentially contact less and less centralized portions of said platen, said screen shifter further including contact screen support means positioned upon said screen position shifter for supporting said contact screen, said contact screen support means further comprising a first contact screen support member positioned at one portion of said shifter and a second contact screen support member positioned at another portion thereof, each of said contact screen support members comprising an elongated slot having a stud member held within said slot, said stud member having a head portion thereof which prevents said stud from falling out of said slot, said stud further having a weight member affixed to a lower portion thereof for maintaining said heat portion of said stud in contact with the upper portion of said slot when said screen position shifter assumes a position whereby said contact screen is not contacting the surface of said vacuum platen together with spring means coupled to said stud for mechanically biasing said stud against an inner terminal portion of said elongated slot.

12. A contact screen positioning assembly for positioning a flexible contact screen over a vacuum platen which is in turn positioned at the imaging plane of a camera comprising:
 a. a screen position shifter movable with respect to said vacuum platen for initially causing central portions of said contact screen to contact central portions of said platen and for thereafter sequentially causing less and less centralized portions of said contact screen to sequentially contact less and less centralized portions of said platen;
 b. contact screen support means including a first contact screen support member positioned at one portion of said screen shifter and a second contact screen support member positioned at another portion thereof, together with biasing means for urging said screen support members inwardly toward central portions of said screen shifter; and
 c. motion control means for permitting outward motion of said screen support members without substantial tipping thereof as said screen shifter approaches said platen.

13. The combination as set forth in claim 12 wherein said motion control means restrains the translation of said screen support members along a path substantially parallel to the surface of said platen.

14. The combination as set forth in claim 12 further including flattening means for flattening said screen at outer portions thereof only after centralized portions of said screen have contacted said platen.

15. The combination as set forth in claim 13 further including flattening means for flattening said screen at outer portions of said platen only after centralized portions of said screen have contacted said platen.

16. The combination as set forth in claim 14 wherein said flattening means comprises movable members movable with respect to said screen shifter only upon contacting said platen upon the descent of said screen shifter, thereby to produce the flattening of said contact screen.

17. The combination as set forth in claim 15 wherein said flattening means comprise movable members movable with respect to said screen shifter only upon contacting said platen upon the descent of said screen shifter, thereby to produce the flattening of said contact screen.

18. The combination as set forth in claim 16 wherein said movable members include pivotable pads mounted upon said screen shifter.

19. The combination as set forth in claim 17 wherein said movable members include pivotable pads mounted upon said screen shifter.

20. The combination as set forth in claim 18 wherein said pivotable pads are spring biased.

21. The combination as set forth in claim 19 wherein said pivotable pads are spring biased.

22. A contact screen positioning assembly for positioning a flexible contact screen over a vacuum platen, which is in turn positioned at the imaging plane of a camera comprising:
 a. a screen position shifter movable with respect to said vacuum platen for initially causing central portions of said contact screen to contact central portions of said platen and for thereafter sequentially causing less and less centralized portions of said contact screen to sequentially contact less and less centralized portions of said platen;
 b. a first carriage means slidably coupled to a first portion of said screen shifter and a second carriage means slidably coupled to a second portion of said screen shifter;
 c. mounting means for coupling a first portion of said screen to said first carriage means and a second portion of said screen to said second carriage means;
 d. carriage spring means coupled to said first and second carriage means for biasing said first and second carriage means in a direction toward centralized portions of said screen shifter; and
 e. pad means mounted upon said first and second carriage means and coupled to said screen for causing the extremities of said screen to become flattened as said pad means presses against the surface of said platen.

23. The combination as set forth in claim 22 wherein said pad means further includes means for coupling said pad means to said first and second carriage means together with pad spring means for resisting a change in position of said pad means with respect to said platen until the applied forces of said pad spring means are overcome by the reaction forces of said platen contacting said pad means.

24. The combination as set forth in claim 23 wherein said pad means further includes means for pivotable mounting said pad means upon said first and second carriage means together with pad spring means for resisting a change in angular position of said pad means with respect to said platen until the applied forces of said pad spring means are overcome by the reaction forces of said platen contacting said pad means.

25. The combination as set forth in claim 22 wherein said carriage means are configured to prevent tipping thereof.

26. The combination as set forth in claim 23 wherein said carriage means are configured to prevent tipping thereof.

27. The combination as set forth in claim 24 wherein said carriage means are configured to prevent tipping thereof.

28. A contact screen positioning assembly for positioning a flexible contact screen over a horizontal vacuum platen which is in turn positioned at the imaging plane of a camera comprising: a screen position shifter vertically movable with respect to said horizontal vacuum platen for supporting said contact screen against gravity so that said contact screen assumes a bowed shape over major portions thereof and for causing central portions of said contact screen to initially contact central portions of said platen and for thereafter sequentially causing less and less centralized portions of said contact screen to sequentially contact less and less centralized portions of said platen, said screen position shifter further including contact screen support means positioned upon opposite sides of said screen position shifter for causing outer portions of said screen coupled thereto to push said contact screen support means away from centralized portions of said vacuum platen during contact of said screen with said platen.

29. The combination as set forth in claim 28 wherein said contact screen support means further include means for mechanically urging said support means toward centralized portions of said screen position shifter.

30. The combination as set forth in claim 28 further including flattening means for flattening said screen solely at outer portions thereof only after centralized portions of said screen have contacted said platen.

31. The combination as set forth in claim 29 further including flattening means for flattening said screen solely at outer portions thereof only after centralized portions of said screen have contacted said platen.

32. The combination as set forth in claim 30 wherein said flattening means further include pivotable pads mounted upon said screen shifter.

33. The combination as set forth in claim 31 wherein said flattening means further include pivotable pads mounted upon said screen shifter.

* * * * *